United States Patent
El-Gawady et al.

(10) Patent No.: US 9,801,050 B2
(45) Date of Patent: Oct. 24, 2017

(54) FORMATTING AN ENDPOINT AS A PRIVATE ENTITY

(71) Applicant: Verizon Patent and Licensing Inc., Arlington, VA (US)

(72) Inventors: Sameh El-Gawady, Waltham, MA (US); Vered Ben-Anat, Cambridge, MA (US); Jason A. Coglon, Morristown, NJ (US); Andrew Wahlon Lam, River Edge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/870,211

(22) Filed: Sep. 30, 2015

(65) Prior Publication Data

US 2017/0094498 A1    Mar. 30, 2017

(51) Int. Cl.
| | |
|---|---|
| *H04W 4/00* | (2009.01) |
| *H04W 8/26* | (2009.01) |
| *H04W 80/00* | (2009.01) |
| *H04W 8/02* | (2009.01) |

(52) U.S. Cl.
CPC ............. *H04W 8/26* (2013.01); *H04W 4/00* (2013.01); *H04W 8/02* (2013.01); *H04W 80/00* (2013.01)

(58) Field of Classification Search
CPC ......... H04W 8/26; H04W 8/02; H04W 60/00; H04W 4/00
USPC .............................. 455/435.1, 461; 370/312
See application file for complete search history.

(56) References Cited

U.S. PATENT DOCUMENTS

| | | | | |
|---|---|---|---|---|
| 7,733,847 | B1* | 6/2010 | Croak | H04L 12/66 370/352 |
| 8,265,040 | B2* | 9/2012 | Wu | H04L 29/12292 370/335 |
| 8,706,904 | B1* | 4/2014 | Stark | G06Q 10/107 709/203 |
| 9,377,985 | B2* | 6/2016 | Reitz | G06F 3/1292 |
| 9,578,511 | B2* | 2/2017 | Kashef | H04L 63/08 |
| 2006/0003782 | A1* | 1/2006 | Jensen | H04B 7/18508 455/517 |
| 2008/0292074 | A1* | 11/2008 | Boni | H04M 3/54 379/93.11 |
| 2011/0032906 | A1* | 2/2011 | Mutikainen | H04L 29/12584 370/331 |
| 2012/0004003 | A1* | 1/2012 | Shaheen | H04W 4/005 455/509 |
| 2012/0236778 | A1* | 9/2012 | Erdmann | H04L 45/22 370/312 |
| 2013/0136072 | A1* | 5/2013 | Bachmann | H04W 4/00 370/329 |

(Continued)

*Primary Examiner* — Mong-Thuy Tran (57) ABSTRACT

An identifier may be generated for an endpoint device associated with a user device. The identifier may include first data indicating that the identifier is generated, second data identifying the user device, and third data identifying the endpoint device from a plurality of endpoint devices associated with the user device. The identifier may be formatted as an International Mobile Subscriber Identity (IMSI). The first data may include a three-digit mobile country code (MCC) not associated with a country. The second data may include a telephone number associated with the user device. The third data includes a counter value incremented for endpoint devices associated with the user device.

20 Claims, 9 Drawing Sheets

(56) References Cited

U.S. PATENT DOCUMENTS

| | | | | |
|---|---|---|---|---|
| 2013/0343256 A1* | 12/2013 | Zakrzewski | ............ | H04W 8/26 370/312 |
| 2014/0135002 A1* | 5/2014 | El-Gawady | ............ | H04W 8/26 455/435.1 |
| 2014/0219127 A1* | 8/2014 | Marinier | ........... | H04W 36/0083 370/252 |
| 2016/0164810 A1* | 6/2016 | Wolz | .................... | H04L 51/046 709/206 |
| 2016/0374068 A1* | 12/2016 | Kim | ..................... | H04W 72/04 |

* cited by examiner

GENERATED
IMSI 000-1234567890-00

ARTIFICIAL
MCC

USER
DEVICE
IDENTIFIER

COUNTER
VALUE

GENERATED
IDENTIFIER
DATA TABLE
600

| GENERATED ID COLUMN 610 | ENDPOINT ADDRESS COLUMN 620 | SERVICES COLUMN 630 |
|---|---|---|
| FIRST GENERATED IMSI | FIRST NETWORK ADDRESS | RECEIVE VOICE CALLS INTENDED FOR USER DEVICE BETWEEN 9PM AND 11PM |
| ⋮ | ⋮ | ⋮ |
| N$^{TH}$ GENERATED IMSI | N$^{TH}$ NETWORK ADDRESS | ACCESS MULTIMEDIA CONTENT ORDERED BY USER DEVICE |

FORMATTING AN ENDPOINT AS A PRIVATE ENTITY

BACKGROUND

In the context of mobile data and communications networks, such as third generation (3G) and fourth generation (4G) (e.g., long-term evolution (LTE)) wireless access technologies, a service provider may use authentication and key agreement (AKA) techniques to determine whether a mobile device, such as a smart phone, is authorized to access services. The mobile device may include hardware and/or software, such as a subscriber identity module (SIM) or a removable user identity module (R-UIM) to provide an AKA response, and the AKA response may include information identifying the mobile device, such as an International Mobile Subscriber Identity (IMSI). The IMSI typically includes fifteen (15) digits. For example, the IMSI may include a three digit mobile country code (MCC), a nine or ten digit mobile subscriber identification number (MSIN), and a two or three digit mobile network code (MNC).

The service provider may store at least a portion of IMSIs (e.g., the MSINs) associated with authorized mobile devices, (e.g., in a home subscriber server (HSS)), and the service provider may authenticate a requesting mobile device by determining whether the mobile device has forwarded an IMSI value that matches one of the stored IMSIs. In another example, the service provider may, after initially authenticating the mobile device using the IMSI, assign a temporary mobile subscriber identity (TMSI) to the mobile device and may subsequently authenticate the mobile device using the TMSI.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations discussed herein relate to generating an identifier for an endpoint device associated with a user device. The identifier may include first data indicating that the identifier is generated, second data identifying the user device, and third data identifying the endpoint device from a plurality of endpoint devices associated with the user device. The identifier may be formatted as an International Mobile Subscriber Identity (IMSI). The first data may include a three-digit mobile country code (MCC) not associated with a country. The second data may include a telephone number associated with the user device. The third data includes a counter value incremented for different endpoint devices associated with the user device.

As used herein, the term "user" is intended to be broadly interpreted to include a user device or a person using the user device. Also, the terms "user," "consumer," "subscriber," and/or "customer" may be used interchangeably.

Figure 1A:
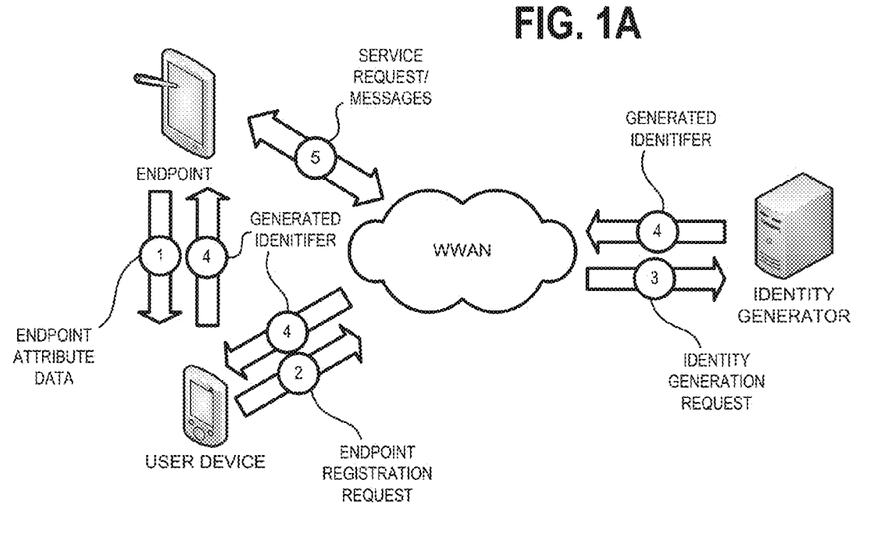
FIGS. 1A and 1B illustrate an exemplary overview of an implementation described herein.

FIGS. 1A and 1B illustrate an exemplary overview of an implementation described herein. As shown in FIG. 1A, a user device, such as a smart phone or a computing device adapted to communicate with a wireless wide area network (WWAN), may collect attribute data (arrow "1" in FIG. 1A) associated with an endpoint. The attribute data may include information associated with the endpoint, such as a media access control address (MAC address), internet protocol (IP) address, a serial number, a manufacturer identifier, a model identifier, a device type, information identifying a functionality, etc. The endpoint (shown in FIG. 1A as a tablet computer) may correspond to another device associated with a user of the user device, such as set-top box (STB), a gaming machine, or a computer that is capable of communicating with the WWAN. For example, the endpoint may include a radio transceiver transmitting to/from the WWAN. In another example, an endpoint may be a fitness tracker, a smart watch, smart glasses, or another peripheral device that may be used in connection with the user device. In this example, the endpoint may use a transceiver of the user device to exchange messages with the WWAN.

The user device may forward an endpoint registration request (arrow "2" in FIG. 1A) to the WWAN, such as a 3G or 4G mobile data and communications network. The endpoint registration request may include, for example, (1) information identifying the user device, such a telephone number, an IMSI, a TMSI, a mobile equipment identifier (MEID), an international mobile station equipment identity (IMEI) for mobile devices, a universally unique identifier (UUID) for non-mobile devices such as WiFi tablets, PC's, etc or other device identifier associated with the user device; and (2) at least a portion of the endpoint attribute data. The WWAN may use the contents of the endpoint registration request to authenticate the user device. For example, the WWAN may determine, based on the identifying information associated with the user device in the endpoint registration request, whether the user device is authorized to register the endpoint.

After the WWAN authenticates the user device (e.g., determines that the user device is authorized to register the endpoint), the WWAN may send an identity generation request (arrow "3" in FIG. 1) to an identity generator. The identity generation request may include information identifying the user device, such as the telephone number, that is included in registration data and/or extracted from stored information associated with the user device. The identity generation request may further include at least a portion of the endpoint attribute data. The identify generator may generate an identifier for the endpoint and may forward the generated identifier (arrow "4" in FIG. 1A) to the endpoint via the WWAN.

Figure 1B:
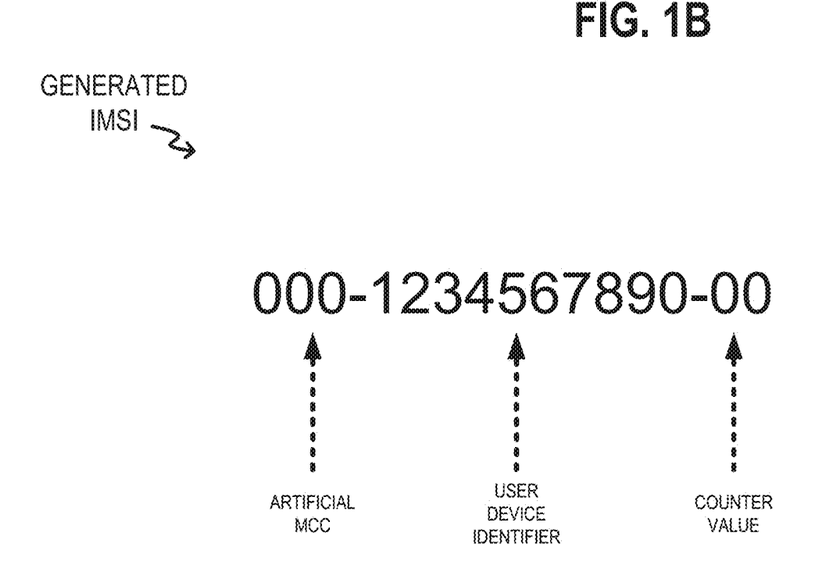

As shown in FIG. 1B, the generated identifier may be formatted as a generated IMSI. For example, the generated identifier may include 15 digits that include a three-digit artificial MCC (e.g., a combination of digits, such as "000" for an MCC value that is not associated with a country), an identifier (e.g., ten digital telephone number) that is associated with the user device, and a two-digit counter and/or function code. In another example, a generated IMSI may include a device type identifier instead of a counter. For example, the device type identifier may indicate whether an associated endpoint is a STB, a computer, smart glasses, smart watch, etc. In the example shown in FIG. 1B, if an endpoint is a first endpoint (e.g., counter value 00) associated with a user device having a telephone number of "123-456-7890," the identify generator may form a generated identifier that corresponds to an IMSI of "000-1234567890-00".

In this way, a private identity may be established for a secondary endpoint in the same format as IMSI (i.e. using 15 digits) so that the traffic can be routed without much modification to existing network element that direct traffic or other services based on IMSI values. Additionally, the generated private identifier may include embedded information indicating the linked phone number. The private identity could then be provisioned into the WWAN using existing components and without significant reprogramming. Moreover, the private identity would be unique, conform to IMSI formats, and would not conflict with any existing IMSIs (e.g., an IMSI associated with the user device).

Returning to FIG. 1A, the WWAN may forward the generated identifier to the endpoint. For example, WWAN may forward the generated identifier directly to the endpoint using the endpoint attribute data (e.g., the MAC address of the endpoint) or may forward the generated identifier to the user device, and the user device may relay the generated identifier to the endpoint. Subsequently, the endpoint may use the generated identifier, for example, to request (arrow "5" in FIG. 1A) services and/or to receive communications directly through the WWAN (e.g., without involving the user device).

Figure 2:
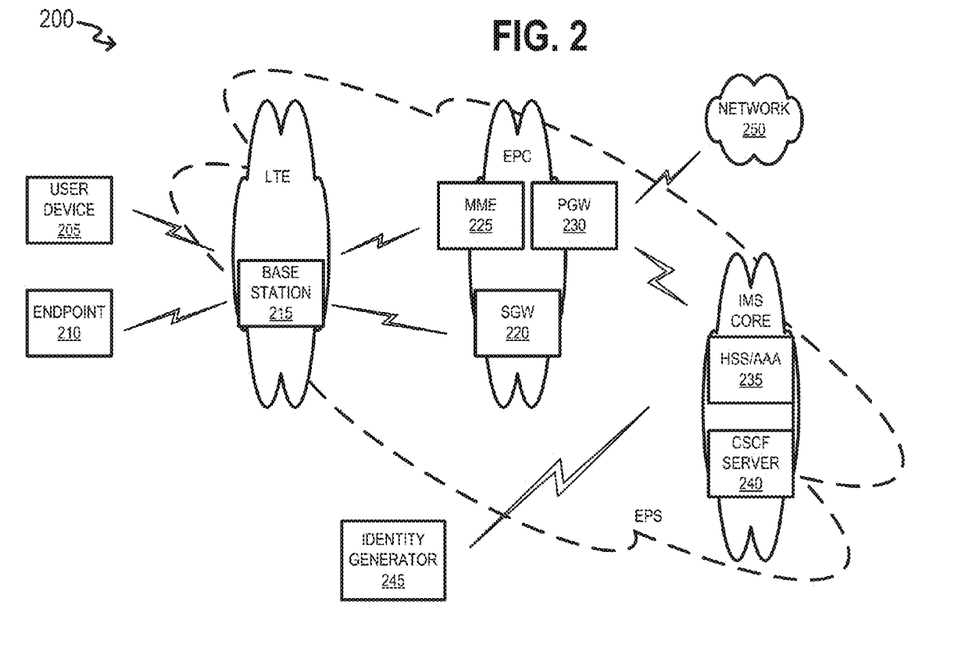
FIG. 2 shows exemplary devices that may be included in an environment in which systems and/or methods described herein may be implemented.

FIG. 2 illustrates an exemplary environment 200 in which systems and/or methods, described herein, may be implemented. As shown in FIG. 2, environment 200 may include a user device 205, an endpoint 210, a base station 215, a serving gateway (SGW) 220, a mobility management entity device (MME) 225, a packet data network (PDN) gateway (PGW) 230, a home subscriber server (HSS)/authentication, authorization, accounting (AAA) server 235 (referred to as an "HSS/AAA server 235"), a call service control function (CSCF) server 240, an identifier generator 245, and a network 250.

Environment 200 may include an evolved packet system (EPS) having a radio access network (RAN), that is associated with a long-term evolution (LTE) network and/or some other type of network, and an evolved packet core (EPC) that operate based on a third generation partnership project (3GPP) wireless communication standard. The RAN network may include one or more base stations, such as evolved Node Bs (eNBs), via which user device 205 communicates with the EPC. The EPC may include SGW 220, MME 225, and/or PGW 230 and may enable user device 205 to communicate with network 250 and/or an Internet protocol (IP) multimedia subsystem (IMS) core. The IMS core may include HSS/AAA server 235 and CSCF server 240, and may process telephone calls on behalf of user device 205 and/or endpoint device 210, and may manage authentication, connection initiation, account information, user profile information, etc. associated with user device 205 and/or endpoint device 210.

User device 205 may include a computation or communication device, such as a wireless mobile communication device that is capable of communicating with base station 215 and/or a network (e.g., network 250, a home wireless network not shown in FIG. 2), and/or a roaming wireless network knot shown in FIG. 2)). For example, user device 205 may include a radiotelephone, a personal communications system (PCS) terminal (e.g., a device that combines a cellular radiotelephone with data processing and data communications capabilities), a personal digital assistant (PDA), a smart phone, a laptop computer, a tablet computer, a camera, a personal gaming system, or another type of computation or communication device. User device 205 may send data to and/or receive data from network 250.

Endpoint 210 may include a device associated with a user of the user device, such as set-top box (STB), a tablet, a gaming machine, a computer or even another user device 205. In another example, an endpoint 210 may be a fitness tracker, a smart watch, smart glasses, or another peripheral and/or wearable device that may be used in connection with the user device. For example, endpoint 210 may lack a SIM, a R-UIM, or other component that would enable endpoint 210 to be authenticated (e.g., via an AKA procedure) within environment 200 without using the generated identifier. As used herein, endpoint 210 may use a generated identifier (e.g., a locally-assigned IMSI) forwarded by identifier generator 245 to access communications and/or data services via environment 200. For instance, endpoint 210 may use the generated identifier to access network 250.

Base station 215 may include one or more network devices that receive, process, and/or transmit traffic, such as audio, video, text, and/or other data, destined for and/or received from user device 205. In an example implementation, base station 215 may be an eNB device and may be part of the LTE network. Base station 215 may receive traffic from and/or send traffic to network 250 via SGW 220 and PGW 230. Base station 215 may send traffic to and/or receive traffic from user device 205 via an air interface. One or more of base stations 215 may be associated with a RAN.

SGW 220 may include one or more network devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 220 may, for example, aggregate traffic received from one or more base stations 215 and may send the aggregated traffic to network 250 via PGW 230. In one example implementation, SGW 220 may route and forward user data packets, may act as a mobility anchor for a user plane during inter-eNB handovers, and may act as an anchor for mobility between LTE and other 3GPP technologies.

MME 225 may include one or more network devices that perform operations associated with a handoff to and/or from the EPS. MME 225 may perform operations to register user device 205 with the EPS, to handoff user device 205 from the EPS to another network, to handoff a user device 205 from the other network to the EPS, and/or to perform other operations. MME 225 may perform policing operations for traffic destined for and/or received from user device 205. MME 225 may authenticate user device 205 and/or endpoint (e.g., via interaction with HSS/AAA server 235).

PGW 230 may include one or more network devices, such as a gateway, a router, a modem, a switch, a firewall, a NIC, a hub, a bridge, a proxy server, an OADM, or some other type of device that processes and/or transfers traffic. PGW 230 may, for example, provide connectivity of user device 205 and/or endpoint 210 associated with a generated identifier to external packet data networks by being a traffic exit/entry point for user device 205 and/or endpoint 210. PGW 230 may perform policy enforcement, packet filtering, charging support, lawful intercept, and/or packet screening. PGW 230 may also act as an anchor for mobility between 3GPP and non-3GPP technologies.

HSS/AAA server 235 may include one or more computing devices, such as a server device or a collection of server devices. In some implementations, HSS/AAA server 235 may include a device that gathers, processes, searches, stores, and/or provides information in a manner described herein. For example, HSS/AAA server 235 may manage, update, and/or store, in a memory associated with HSS/AAA server 235, profile information associated with user device 205 and/or endpoint 210 associated with a generated identifier that identifies applications and/or services that are permitted for and/or accessible by an associated user of user device 205 and/or endpoint 210, such as roaming network access services, bandwidth or data rate thresholds associated with the applications or services, information associated with the user (e.g., a username, a password, a personal identification number (PIN), etc.), rate information, minutes allowed, and/or other information.

Additionally, or alternatively, HSS/AAA server 235 may perform authentication, authorization, and/or accounting operations associated with a communication connection with user device 205 and/or endpoint 210. In some implementations, HSS/AAA server 235 may maintain billing information and may assess charges and credits to an account associated with user device 205 and/or endpoint 210 based on network usage information received from the EPC and/or from a roaming gateway knot shown in FIG. 2). Additionally, or alternatively, HSS/AAA server 235 may store information regarding temporary credentials that may be assigned to user device 205 and/or endpoint 210.

In one implementation, HSS/AAA server 235 may receive and store information from identifier generator 245 associated with a generated identifier for endpoint 210. Subsequently, HSS/AAA server 235 may evaluate the generated identifier, when forwarded by endpoint 210, to determine whether endpoint 210 is authorized to access data and/or communications services via environment 200. For example, HSS/AAA server 235 may identify a particular user device 205 associated with endpoint 210 based on the generated identifier, and HSS/AAA server 235 may identify privileges, costs, usage limitations, etc. associated with endpoint 210 based on privileges, costs, usage limitations, etc. for user device 205.

In this way, HSS/AAA server 235 or another component of the IMS Core may function to provide traffic or otherwise provide services to endpoint 210 without requiring changes to the programming the IMS core or other components shown in FIG. 2. For example, endpoint 210 may appear as a normal cellular connected device (as opposed to a WiFi-only device without an IMSI). For example, certain technologies allow a user to be selectively reached at different user devices 205 at different times (e.g., calls are directed to a first user device 205 during working hours and directed to a second, different user device 205 during other times), and these technologies may be adapted without reprogramming network components to forward communications to an endpoint 210 at desired times using the generated identifier.

CSCF server 240 may include one or more computing devices that process and/or route IMS traffic to and from user device 205 via the EPC. For example, CSCF server 240 may process traffic, associated with services provided by the IMS core, that are destined for user device 205. In another example, CSCF server 240 may process traffic, received from user device 205, that are destined for the IMS core.

Identifier generator 245 may generate a network identity (e.g., a locally-assigned IMSI) that may be used by endpoint 210 to access communications and/or data services within a home network via environment 200. For example, identifier generator 245 may generate a locally-assigned IMSI that includes 15 digits. The locally-assigned IMSI may include a 3 digit artificial MCC. For example, certain numerical values, such as "000" are reserved from use as MCC and are generally not assigned to IMSIs associated with user devices 205, and identifier generator 245 may generate a locally-assigned IMSI that includes one of these reserved values. In another example, a smallest currently used MCC value is "202" that is associated with Greece, and a largest currently used MCC value is "901" that is associated with satellite networks and Antarctica, and identifier generator 245 may generate a locally-assigned IMSI that includes an artificial MCC code that is less than 202 or more than 901. In this way, identifier generator 245 may generate a locally-assigned IMSI that would not correspond to an actual IMSI associated with any user devices 205.

Identifier generator 245 may form the locally-assigned IMSI to further include a telephone number or other identifier associated with a particular user device 205. In this way, when endpoint 210 presents the locally-assigned IMSI, a component of environment 200 (e.g., HSS/AAA server 235) may parse the locally-assigned IMSI to identify particular user device 205 associated with endpoint 210. In this way, environment 200 may differentiate between endpoints 210 associated with different user device 205, and environment 200 may further assign rights and/or privileges to endpoints 210 based on rights and/or privileges associated with user device 205. For example, environment 200 may forward a message (e.g., a text or other short-messaging service (SMS) message) associated with user device 205 to endpoint 210.

Identifier generator 245 may form the locally-assigned IMSI to further include a counter value that is incremented for different endpoints associated with a same user device 205. For example, a first endpoint 210 (e.g., a smart watch) may be assigned a locally-assigned IMSI that ends or otherwise includes a counter value of "00," and a second endpoint 210 (e.g., smart glasses) may be assigned a different locally-assigned IMSI that ends or otherwise includes a counter value of "01." In this way, identifier generator 245 may generate and assign a different locally-assigned IMSI to each endpoint 210. For example, if endpoint 210 is a tenth endpoint (e.g., counter value 09) associated with user device 205 and user device 205 has a telephone number of "111-222-3333," identifier generator 245 may form a generated identifier that corresponds to "000-1112223333-09".

Although shown in a separate component in environment 200, it should be appreciated that identifier generator 245 may be included or otherwise coupled to another component included in environment 200. For example, identifier generator 245 may be included in a component of an IMS core (e.g., HSS/AAA 235) or identifier generator 245 may be located remotely from environment 200.

Network 250 may include one or more wired and/or wireless networks. For example, network 250 may include a data network, such as the Internet, a public land mobile network (PLMN), and/or another network. Additionally, or alternatively, network 250 may include a local area network (LAN), a wide area network (WAN), a metropolitan network (MAN), the Public Switched Telephone Network (PSTN), an ad hoc network, a managed IP network, a virtual private network (VPN), an intranet, the Internet, a fiber optic-based network, and/or a combination of these or other types of networks.

The quantity of devices and/or networks, illustrated in FIG. 2, is provided for explanatory purposes only. In practice, environment 200 may include additional devices and/or networks, fewer devices and/or networks, different devices and/or networks, or differently arranged devices and/or networks than those illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
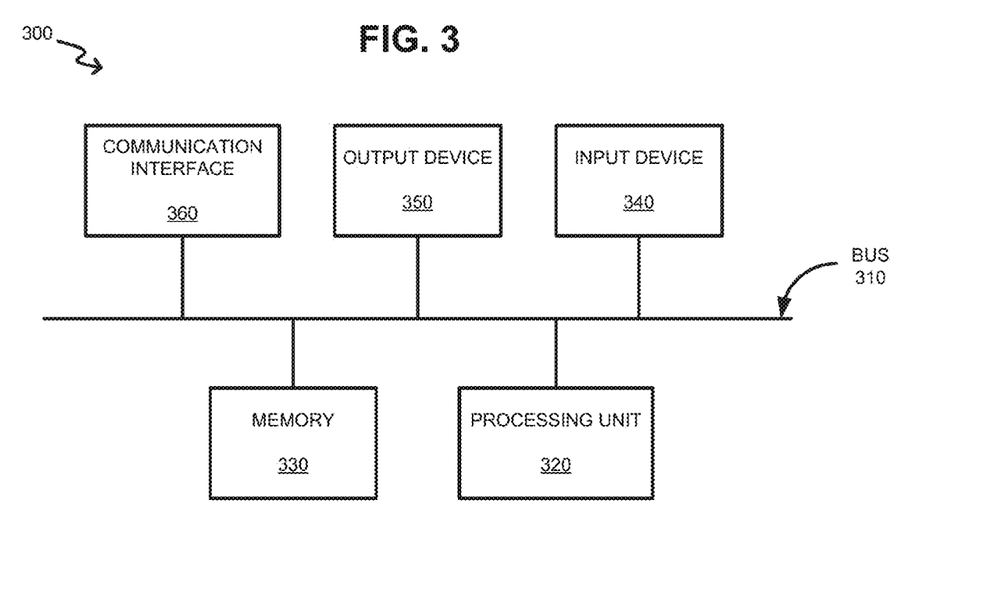
FIG. 3 shows a diagram of exemplary components that may be included in a computing device included in the environment shown in FIG. 2.

FIG. 3 is a diagram illustrating exemplary components of a computing device 300. User device 205, endpoint 210, base station 215, SGW 220, MME 225, PGW 230, HSS/AAA server 235, CSCF server 240, identifier generator 245, and/or network 250 may include one or more devices 300 and/or one or more components of computing device 300. As shown in FIG. 3, computing device 300 may include a bus 310, a processor 320, a memory 330, an input component 340, an output component 350, and a communication interface 360.

Bus 310 may include a path that permits communication among the components of computing device 300. Processor 320 may include a processor, a microprocessor, or processing logic that may interpret and execute instructions. Memory 330 may include any type of dynamic storage device that may store information and instructions, for execution by processor 320, and/or any type of non-volatile storage device that may store information for use by processor 320.

Input component 340 may include a mechanism that permits a user to input information to computing device 300, such as a keyboard, a keypad, a button, a switch, etc. Output component 350 may include a mechanism that outputs information to the user, such as a display, a speaker, one or more light emitting diodes (LEDs), etc. Communication interface 360 may include a transceiver mechanism that enables computing device 300 to communicate with other devices and/or systems via wireless communications, wired communications, or a combination of wireless and wired communications. For example, communication interface 360 may include mechanisms for communicating with another device or system via a network. Alternatively or additionally, communication interface 360 may be a logical component that includes input and output ports, input and output systems, and/or other input and output components that facilitate the transmission of data to other devices. In one implementation, user device 205 and/or endpoint 210 may include an antenna to exchange signals with base station 215.

Computing device 300 may perform certain operations in response to processing unit 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of computing device 300, in other implementations, computing device 300 may contain fewer components, additional components, different components, or differently arranged components than those depicted in FIG. 3. For example, computing device 300 may include one or more switch fabrics instead of, or in addition to, bus 310. In another example, in some implementations, a display may not be included in computing device 300, and in these situations, computing device 300 may be a "headless" device that does not include input component 340. Additionally or alternatively, one or more operations described as being performed by a particular component of computing device 300 may be performed by one or more other components, in addition to or instead of the particular component of computing device 300.

Figure 4:
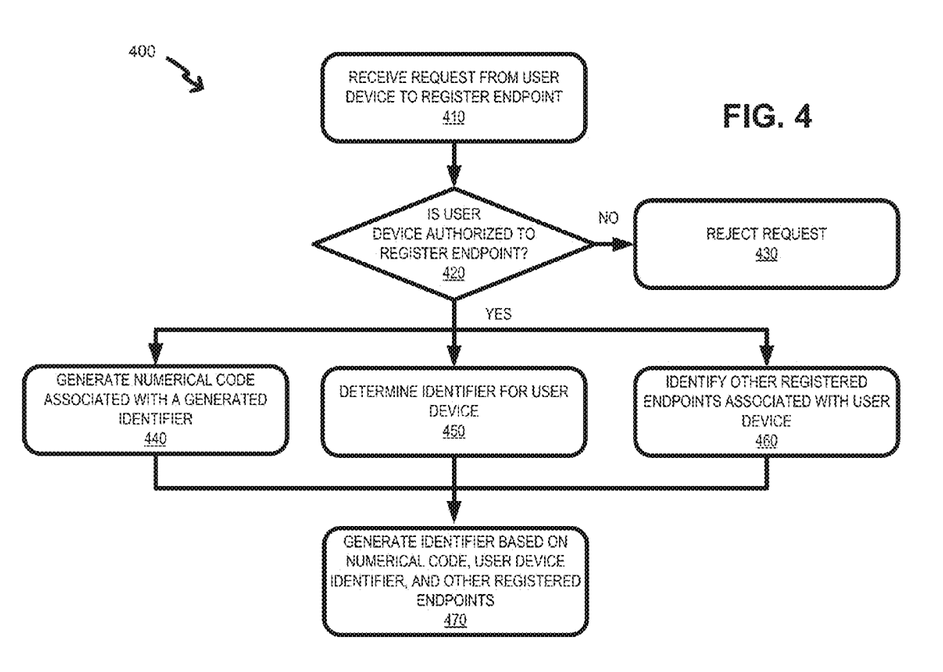
FIG. 4 is a flow diagram illustrating an exemplary process for generating an identifier for an endpoint included in the environment shown in FIG. 2.

FIG. 4 is a flow diagram illustrating an exemplary process 400 for generating an identifier for endpoint 210. In one implementation, process 400 may be performed by identifier generator 245. In other implementations, process 500 may be performed by one or more other devices of environment 200, such as user device 205, base station 215, a component of an EPC (e.g., SGW, MME 225, and/or PGW 230), and/or a component of an IMS core (e.g., HSS/AAA 235 and/or CSCF server 240).

As shown in FIG. 4, process 400 may include receiving a request to register an endpoint 210 (block 410). For example, as described above with respect to FIG. 1A, user device 205 may forward a request to register endpoint 210 to enable endpoint 210 to access certain services and/or communications, and the request may include information identifying user device 205, such as an IMSI associated with user device 205. In certain implementations, the request may further include information identifying services and/or communications to be accessed by endpoint 210, after being registered.

As shown in FIG. 4, process 400 may further include determining whether user device 205 is authorized to register endpoint 210 (block 420). For example, identifier generator 245 (or other component of environment 200) may identify user device 205 based on the contents of the request to register the endpoint 210. Additionally, or alternatively, identifier generator 245 may identify user device 205 based on one or more attributes of a transmission carrying the registration request, such as a signal strength, wavelength, attenuation, etc. Identifier generator 245 may further verify that the registration request originated from the identified user device 205. For example, identifier generator 245 may determine whether the registration request includes verification data (e.g., a personal identification number (PIN)) associated with the identified user device 205 and may determine whether the verification data is correct.

In block 420, identifier generator 245 may determine whether an identified user device 205 is authorized (e.g., based on account settings associated with user device 205) to register one or more endpoint devices. For example, identifier generator 245 may determine account settings for user device 205 enable registration of an endpoint. In another example, identifier generator 245 may determine whether a component of environment 200 (e.g., HSS/AAA server 235) has determined that user device 205 is somehow compromised (e.g., infected with a computer virus and/or is being used by an unauthorized user), and in these instances, identifier generator 245 may determine that user device 205 is not authorized to register any endpoints 210. If user device 205 is not authorized to register endpoint 210 (block 420—No), the registration request is rejected (block 430). For example, identifier generator 245 may forward a message to user device 205 indicating that the registration request cannot be completed.

As shown in FIG. 4, if user device 205 is authorized to register endpoint 210 (block 420—Yes), process 400 may further include generating a numerical code associated with a generated identifier (block 440), determining an identifier for user device 205 (block 450), and identifying other registered endpoints associated with user device 205 (block 460). Identifier generator 245 may then generate an identifier, such as a locally-assigned IMSI, using the numerical code, the user device identifier, and an indication of the other registered endpoints (block 470). For example, in block 440, identifier generator 245 may select a 3 digit MCC that is reserved or otherwise not used not used for a country (such as "000") so that a locally-assigned IMSI that would not correspond to actual IMSIs associated with user devices 205. In block 450, identifier generator 245 may determine a telephone number or other identifier associated with a particular user device 205 so that a locally-assigned IMSI readily identifies user device 205 associated with an endpoint. In block 460, identifier generator 245 may form the locally-assigned IMSI to further include a counter value that is incremented for different endpoints associated with a same user device 205 so that a different locally-assigned IMSI is assigned to each endpoint 210. For example, if a numerical code of "000", is selected, user device 205 has a telephone number of "111-222-3333," and endpoint 210 is a tenth endpoint (e.g., counter value 10) registered with user device 205, identifier generator 245 may form a generated identifier that corresponds to "000-1112223333-10".

Figure 5:
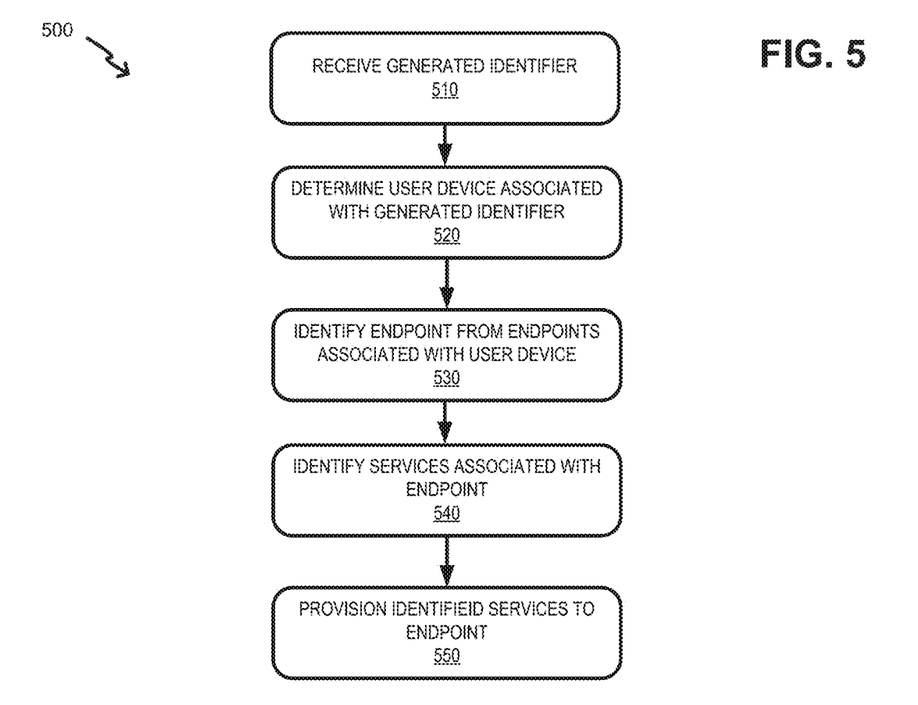
FIG. 5 is a flow diagram illustrating an exemplary process for processing a generated identifier received from an endpoint included in the environment shown in FIG. 2.

FIG. 5 is a flow diagram illustrating an exemplary process 500 for processing a generated identifier received from endpoint 210. In one implementation, process 500 may be performed by one or more other devices of environment 200, base station 215, a component of an EPC (e.g., SGW, MME 225, and/or PGW 230), and/or a component of an IMS core (e.g., HSS/AAA 235 and/or CSCF server 240).

As shown in FIG. 5, process 500 may include receiving a generated identifier from endpoint 210 (block 510). For example, base station 215 may receive a request from endpoint 210 for certain data and/or communications services. In another example, user device 205 may forward a request for data and/or communications services to be provided to endpoint 210 associated the generated identifier. As previously described, a generated identifier associated with endpoint 210 may include a portion that indicates that the generated identifier is not associated with user device 205. For example, as previously described, a generated IMSI may include a MCC value, such as "000" that is reserved or otherwise not used to any country. Thus, a generated IMSI value associated with endpoint 210 may include an MCC value that is not associated with a country, whereas user device 205 may be associated with an IMSI that includes an MCC value associated with a country.

As shown in FIG. 5, process 500 may further include identifying a user device 205 associated with the generated identifier (block 520) and identifying a endpoint associated with the generated identifier (block 530). For example, a generated IMSI value may include a section that includes a telephone number or other identifier associated with user device 205, and may further include another section that includes a counter identifying different endpoints associated with the identified user device 205. As previously described, different endpoints associated with a user device 205 may be associated with different counter values so that each endpoint may operate independently within environment 200.

Once the endpoint 210 and user device 205 are identified, services associated with the endpoint 210 may be identified (block 540) and the identified services may be provisioned to the endpoint (block 550). For example, user device 205 may specify, e.g., in a registration request or other message, certain telecommunications and/or data services that should be available to endpoint 210. For example, user device 205 may specify that the endpoint 210 may receive voice communications (e.g., a telephone call) or other types of messages (e.g., SMS or e-mail) at certain times, or that endpoint 210 may be allowed to initiate voice communications and/or other types of messages to certain people (e.g., family members) but not to a non-designed party.

Figure 6:
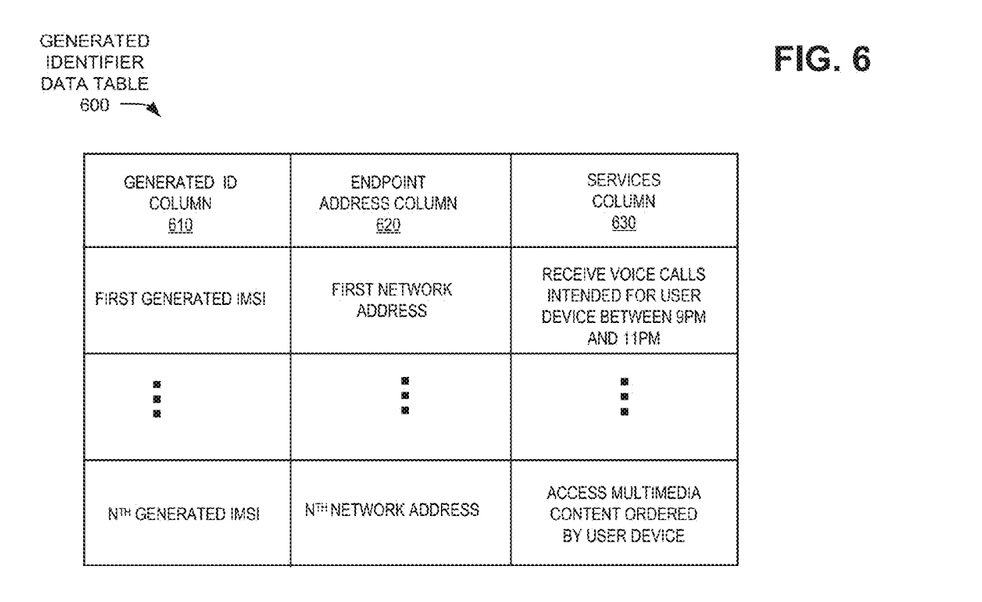
FIG. 6 shows an exemplary generated identifier (ID) data table that may store information regarding an identifier for an endpoint included in the environment shown in FIG. 2.

FIG. 6 shows an exemplary generated identifier (ID) data table 600 that may store information regarding a generated identifier. Generated ID data table 600 may be generated and/or accessed by a component environment 200, such as HSS/AAA 235. For example, the contents of generated ID data table 600 may be used to identify an endpoint and to provision certain telecommunications and/or data services to that endpoint. As shown in FIG. 6, generated ID data table 600 may include, for example, entries stored in a generated ID column 610, an endpoint address column 620, and a services column 630. In generated ID data table 600, entries in a horizontal row are associated with a same endpoint 210 (e.g., such that a same endpoint 210 is associated with a "First Generated IMSI," a "First Network Address," and a service column entry of "Receiv[ing] voice calls intended for user device between 9 PM and 11 PM."

Generated ID column 610 may include entries that store generated identifiers, such as generated IMSIs, generated by identifier generator 245. For example, entries in generated ID column 610 may store generated IMSI values (e.g., that include an artificial MCC value, a telephone number associated with user device 205, and a counter value), such as a "first generated IMSI" and an "$N^{th}$ generated IMSI." Endpoint address column 620 may store a network address or other information that may be used by a component of environment 200 to contact endpoints 210. For example, address column 620 may store entries identifying a MAC address and/or an IP address associated with endpoints 210. Services column 630 may store entries identifying services to be provided to or otherwise available to endpoint 210. For example, a first endpoint 210 may "Receive voice calls intended for user device between 9 PM and 11 PM," and an $N^{th}$ endpoint 210 may "Access multimedia content ordered by user device" 205.

Figure 7A:
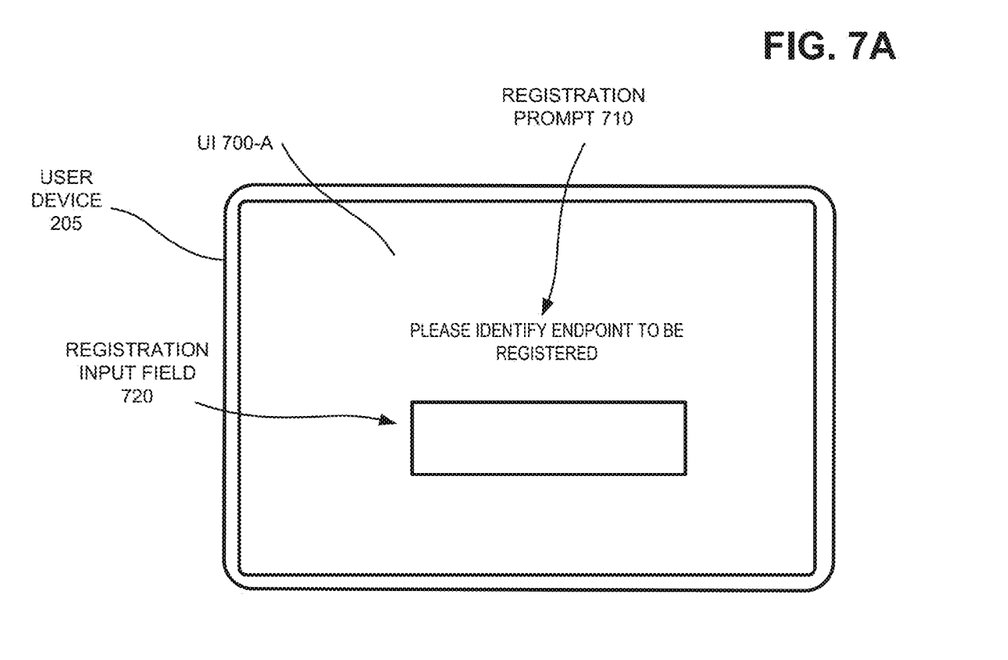
FIGS. 7A and 7B depict an exemplary user interface that may be presented by user device included in the environment shown in FIG. 2.
Figure 7B:
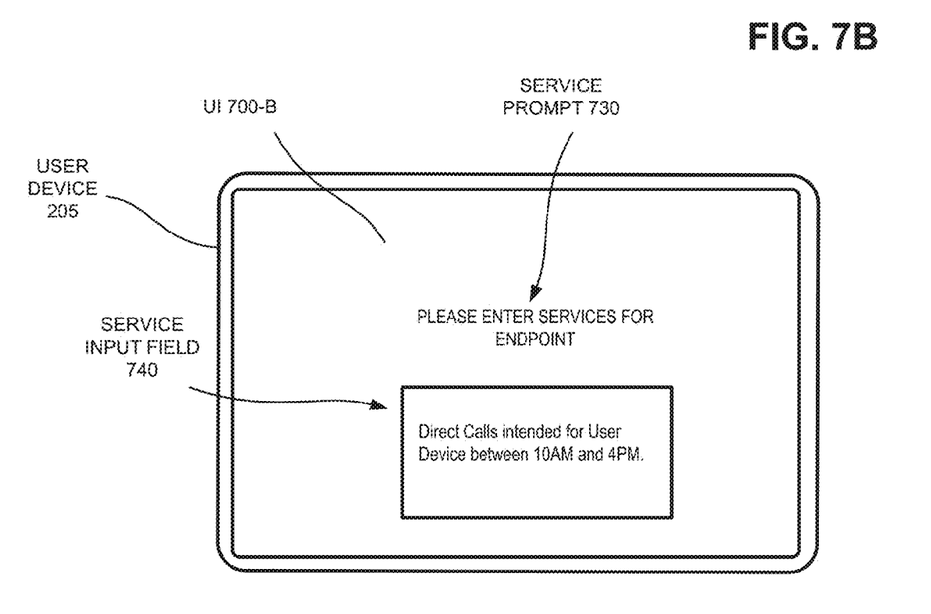

FIGS. 7A and 7B depict an exemplary UI 700 (shown as UI 700-A in FIG. 7A and as UI 700-B in FIG. 7B] that may be presented by user device 205. As shown in FIG. 7A, UI 700-A may include a registration prompt 710 that directs a user of user device 205 to input data identifying an endpoint (such as a MAC address associated with endpoint 210). As shown in FIG. 7A, UI 700-A may further include a registration input field 720 that may be used by the user to input the data identifying an endpoint, such as a MAC address associated with endpoint 210. In one implementation, registration input field 720 may be pre-populated with data associated with one or more detected endpoints 210, such as endpoints 210 that are connected to user device 205 via a short-range communication technology, such as Wi-Fi®, Bluetooth®, or NFC (near field communication).

As shown in FIG. 7B, UI 700-B may include a service prompt 730 that directs the user of user device 205 to input data identifying a service to be provided to an endpoint and a service input field 740 that may be used by the user to input the data identifying the service. For example, UI 700-B may be used to specify that endpoint 210 may receive certain types of communications at certain times and/or from certain people (e.g., the displayed example includes "Direct[ing] Calls intended for User Device between 10 AM and 4 PM"). In another example, UI 700-B may be used to specify that endpoint 210 may access certain types of data at certain times. In one implementation, service input field 720 may be pre-populated with data (e.g., a drop down menu, etc.) identifying one or more services that are capable of being accessed and/or received by endpoint 210. For example, user device 205 may identify a device type associated with endpoint 210 and may determine types of services that may be access via that type of device. In another example, user device 205 may communicate with endpoint 210 to determine capabilities of endpoint 210 (e.g., to determine whether endpoint 210 includes an audio output mechanism to present audio content and/or a display component to present visual content).

Various preferred embodiments have been described herein with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of blocks has been described with respect to FIGS. 4 and 5, the order of the blocks in processes 400 and 500 may be modified in other implementations. Furthermore, non-dependent blocks may be performed in parallel. Furthermore, processes 400 and 500 may include additional and/or fewer blocks than shown in FIGS. 4 and 5. For example, process 400 may further include generating a TMSI value for endpoint 210 and enabling endpoint 210 to access a service using the TMSI (e.g., instead of the generated IMSI).

It will be apparent that different aspects of the description provided above may be implemented in many different forms of software, firmware, and hardware in the implementations illustrated in the figures. The actual software code or specialized control hardware used to implement these aspects is not limiting of the implementations. Thus, the operation and behavior of these aspects were described without reference to the specific software code—it being understood that software and control hardware can be designed to implement these aspects based on the description herein.

What is claimed is:

1. A method comprising:
  receiving, by a processor, a request to register an endpoint device to access a wireless wide area network (WWAN), wherein the request includes information identifying a user device associated with the endpoint device;
  identifying, by the processor, the user device associated with the endpoint device;
  generating, by the processor, an identifier for the endpoint device,
    wherein the identifier includes first data indicating that the identifier is associated with the endpoint device, second data identifying the user device, and third data identifying the endpoint device from a plurality of endpoint devices associated with the user device,
    wherein the first data includes a three-digit mobile country code (MCC),
    wherein the three-digit MCC used in the identifier is not used for a country,
    wherein the third data includes a counter value, and
    wherein the counter value is incremented for each of the plurality of endpoint devices associated with the user device that is registered to access the WWAN; and
  forwarding, by the processor, the identifier to the endpoint device, wherein the endpoint device uses the identifier to access a service via the WWAN.

2. The method of claim 1, wherein the identifier is formatted as an International Mobile Subscriber Identity (IMSI).

3. The method of claim 1, wherein the second data includes a telephone number associated with the user device.

4. The method of claim 1, wherein the request is received from the user device, and wherein the method further comprises:
  determining whether the user device is authorized to register the endpoint device, wherein the identifier is generated based on determining that the user device is authorized to register the endpoint device.

5. The method of claim 1, wherein accessing the service includes receiving, via the WWAN, a message or a communication intended for the user device.

6. The method of claim 1, further comprising storing the identifier in a table.

7. The method of claim 1, wherein the user device and the endpoint device are associated with a same user.

8. A device comprising:
  a memory to store one or more instructions; and
  a processor configured to execute the one or more instructions to:
    receive a request to register an endpoint device to access a wireless wide area network (WWAN),
      wherein the request includes information identifying a user device associated with the endpoint device;
    identify the user device associated with the endpoint device;
    generate an identifier for the endpoint device,
      wherein the identifier includes first data indicating that the identifier is associated with the endpoint device, second data identifying the user device, and third data identifying the endpoint device from a plurality of endpoint devices associated with the user device,
      wherein the first data includes a three-digit mobile country code (MCC),
      wherein the three-digit MCC used in the identifier is not used for a country,
      wherein the third data includes a counter value, and
      wherein the counter value is incremented for each of the plurality of endpoint devices associated with the user device that is registered to access the WWAN; and
    forward the identifier to the endpoint device, wherein the endpoint device uses the identifier to directly access a service via the WWAN.

9. The device of claim 8, wherein the identifier is formatted as an International Mobile Subscriber Identity (IMSI).

10. The device of claim 8, wherein the second data includes a telephone number associated with the user device.

11. The device of claim 8, wherein the request is received from the user device, and wherein the processor is further configured to execute the one or more instructions to:

determine whether the user device is authorized to register the endpoint device, wherein the identifier is generated based on determining that the user device is authorized to register the endpoint device.

12. The device of claim 8, wherein the processor is further configured to execute the one or more instructions to store the identifier in a table.

13. The device of claim 8, wherein the user device and the endpoint device are associated with a same user.

14. A non-transitory computer-readable medium to store instructions, the instructions comprising:
   one or more instructions that when executed by a processor, cause the processor to:
      receive a request to register an endpoint device to access a wireless wide area network (WWAN),
         wherein the request includes information identifying a user device associated with the endpoint device;
      identify the user device associated with the endpoint device;
      generate an identifier for the endpoint device,
         wherein the identifier includes first data indicating that the identifier is associated with the endpoint device, second data identifying the user device, and third data identifying the endpoint device from a plurality of endpoint devices associated with the user device,
         wherein the first data includes a three-digit mobile country code (MCC),
         wherein the three-digit MCC used in the identifier is not used for a country,
         wherein the third data includes a counter value, and
         wherein the counter value is incremented for each of the plurality of endpoint devices associated with the user device that is registered to directly access the WWAN; and
      forward the identifier to the endpoint device, wherein the endpoint device uses the identifier to directly access a service via the WWAN.

15. The non-transitory computer-readable medium of claim 14, wherein the identifier is formatted as an International Mobile Subscriber Identity (IMSI).

16. The non-transitory computer-readable medium of claim 14, wherein the second data includes a telephone number associated with the user device.

17. The non-transitory computer-readable medium of claim 14, wherein the request is received from the user device, and wherein one or more instructions further cause the processor to:
   determine whether the user device is authorized to register the endpoint device, wherein the identifier is generated based on determining that the user device is authorized to register the endpoint device.

18. The non-transitory computer-readable medium of claim 14, wherein the request further includes information identifying the service.

19. The non-transitory computer-readable medium of claim 14, wherein the one or more instructions further cause the processor to store the identifier in a table.

20. The non-transitory computer-readable medium of claim 14, wherein the user device and the endpoint device are associated with a same user.

* * * * *